United States Patent
Ooba et al.

(10) Patent No.: US 10,146,247 B2
(45) Date of Patent: Dec. 4, 2018

(54) REACTION FORCE OUTPUT DEVICE

(71) Applicant: HONDA LOCK MFG. CO., LTD., Miyazaki-Shi, Miyazaki (JP)

(72) Inventors: Takashi Ooba, Miyazaki (JP); Hiroyuki Kouzuma, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 366 days.

(21) Appl. No.: 15/027,378

(22) PCT Filed: Sep. 16, 2014

(86) PCT No.: PCT/JP2014/074389
§ 371 (c)(1),
(2) Date: Apr. 5, 2016

(87) PCT Pub. No.: WO2015/053046
PCT Pub. Date: Apr. 16, 2015

(65) Prior Publication Data
US 2016/0246321 A1   Aug. 25, 2016

(30) Foreign Application Priority Data

Oct. 8, 2013  (JP) .................................. 2013-211137

(51) Int. Cl.
*G05G 1/44* (2008.04)
*G05G 5/03* (2008.04)
*B60K 26/02* (2006.01)
*F16H 19/08* (2006.01)

(52) U.S. Cl.
CPC ............... *G05G 5/03* (2013.01); *B60K 26/02* (2013.01); *B60K 26/021* (2013.01); *F16H 19/08* (2013.01); *B60K 2026/022* (2013.01); *G05G 1/44* (2013.01)

(58) Field of Classification Search
CPC .................. B60K 26/02; B60K 26/021; B60K 2026/022; G05G 5/03; G05G 1/44; F16H 19/08
See application file for complete search history.

(56) References Cited

U.S. PATENT DOCUMENTS 6,474,753 B1 *  11/2002  Rieth ....................... G05G 1/38
                                                     180/271
2007/0252811 A1 *  11/2007  Arche ..................... A63F 13/06
                                                     345/156

(Continued)

FOREIGN PATENT DOCUMENTS

CN          102642466 A      8/2012
CN          103635344 A      3/2014

(Continued)

OTHER PUBLICATIONS

PCT/ISA/210 from PCT/JP2014/074389 with the English translation thereof.

(Continued)

*Primary Examiner* — Hussein Elchanti
(74) *Attorney, Agent, or Firm* — Carrier Blackman & Associates, P.C.; Joseph P. Carrier; William D. Blackman

(57) ABSTRACT

A reaction force output device is provided with: a drive unit that drives a drive member to output a force in a direction opposite to an operating direction to an operated element operated by an operator; and a control unit that determines whether or not a space is formed between the operated element and the drive member, and if it is determined that the space is formed, controls the drive unit to output a greater driving force than when it is determined that the space is not formed.

6 Claims, 11 Drawing Sheets

(56) References Cited

U.S. PATENT DOCUMENTS

| | | | |
|---|---|---|---|
| 2009/0105953 A1* | 4/2009 | Sugano | B60W 30/16 |
| | | | 701/301 |
| 2010/0083789 A1 | 4/2010 | Osawa et al. | |
| 2011/0031072 A1* | 2/2011 | Leiber | B60T 8/00 |
| | | | 188/72.3 |
| 2011/0214526 A1* | 9/2011 | Demma | B60K 26/021 |
| | | | 74/560 |
| 2012/0143441 A1 | 6/2012 | Yamazaki et al. | |
| 2013/0197771 A1* | 8/2013 | Takeda | B60T 13/745 |
| | | | 701/70 |

FOREIGN PATENT DOCUMENTS

| | | |
|---|---|---|
| DE | 10348642 A1 | 5/2005 |
| EP | 2 613 217 A1 | 7/2013 |
| JP | 2007-026218 A | 2/2007 |
| JP | 2010-111379 A | 5/2010 |
| JP | 2011-005929 A | 1/2011 |
| JP | 2012-069043 A | 4/2012 |
| JP | 2012-116355 A | 6/2012 |

OTHER PUBLICATIONS

Office Action dated Nov. 21, 2016 for corresponding Chinese Application No. 201480054955.3.
Extended European search report for EP Patent Application #14852076.0 dated Aug. 3, 2017.

* cited by examiner

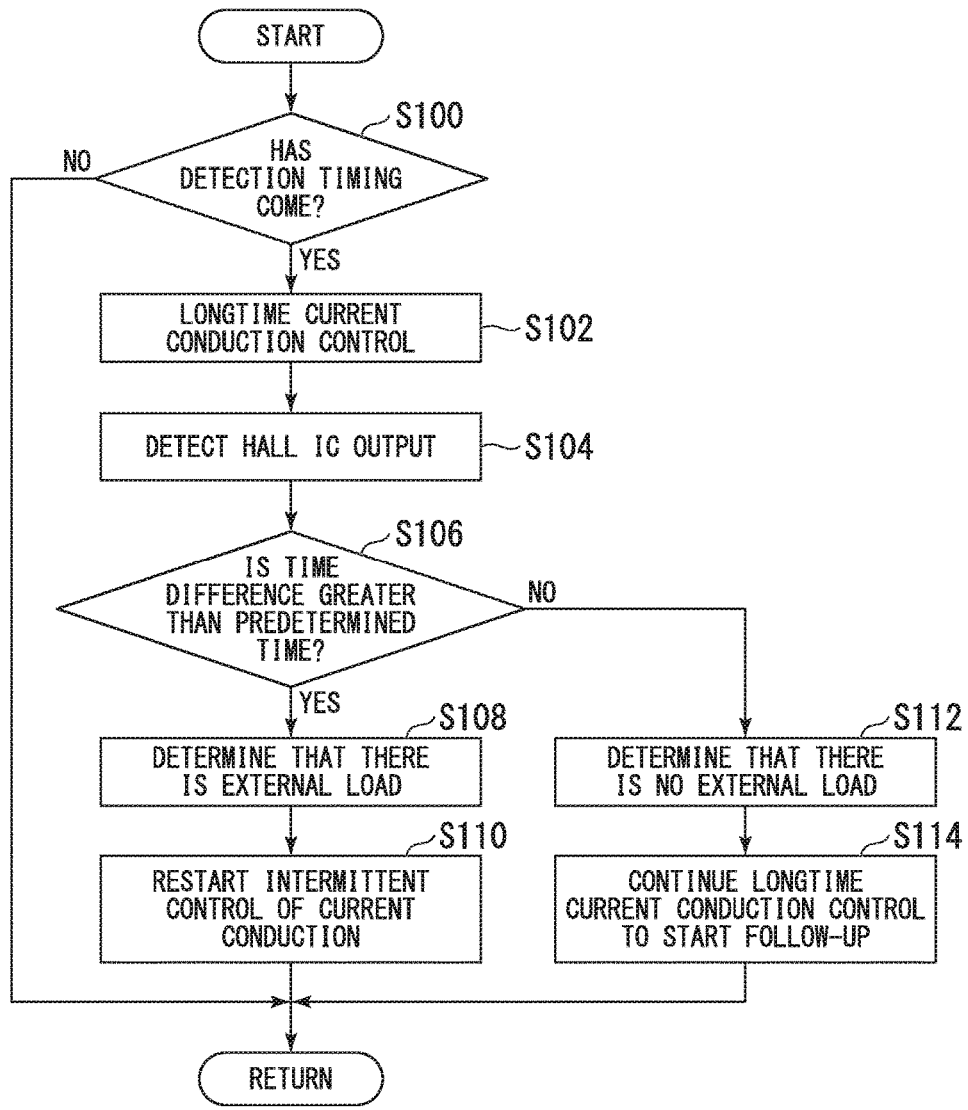

REACTION FORCE OUTPUT DEVICE

TECHNICAL FIELD

The present invention relates to a reaction force output device.

Priority is claimed on Japanese Patent Applications No. 2013-211137, filed on Oct. 8, 2013, the contents of which are incorporated herein by reference.

BACKGROUND ART

To restrain unintended sudden acceleration, or the like when a vehicle starts or while it is traveling, for example, an accelerator pedal device that outputs a force (reaction force) in the opposite direction of a force (pedaling force) for pressing an accelerator pedal to the accelerator pedal has recently been developed (e.g., see Patent Literature 1).

In the accelerator pedal device described in Patent Literature 1, a return spring for returning a pedal arm to an initial position, a motor for generating a reaction force, and a lever for transmitting rotation of the motor to the pedal arm are installed in a housing that pivotably supports a base end of the pedal arm. This accelerator pedal device is configured such that the motor is controlled to an output corresponding to a pressed state of the accelerator pedal by a control unit, and such output is given to the pedal arm through the transmitting lever.

CITATION LIST

Patent Literature

[Patent Literature 1]
Japanese Unexamined Patent Application, First Publication No. 2010-111379

SUMMARY OF INVENTION

Technical Problem

However, although the motor generates the reaction force in the accelerator pedal device described in Patent Literature 1, there are cases in which the reaction force from a pressing operation increases more than needed due to an increase in friction torque occurring in a closed circuit of the motor. To avoid this, for example, if current conduction to the motor is restrained, the output of the motor may be insufficient, and a drive member of the motor may not sufficiently follow the pedal arm.

An aspect according to the present invention is directed to providing a reaction force output device capable of improving followability.

Solution to Problem

A reaction force output device of the present invention employs the following constitutions.

(1) A reaction force output device of an aspect according to the present invention includes: a drive unit configured to drive a drive member to output a force in a direction opposite to an operating direction to an operated element operated by an operator; and a control unit configured to determine whether or not a space is formed between the operated element and the drive member, and to control the drive unit to output a greater driving force when it is determined that the space is formed than when it is determined that the space is not formed.

According to the aspect of (1), when the space is formed between the operated element and the drive member, the reaction force output device outputs the greater driving force, and thus the drive member follows the operated element. For this reason, it is difficult for the space to be formed between the drive member and the operated element. Therefore, a reaction force output by the reaction force output device can be accurately transmitted to the reaction force, and for example, an acceleration feeling can be improved.

(2) In the aspect of (1), when it is determined that the space is not formed, the control unit may control the drive unit by intermittently performing current conduction to the drive unit on the basis of a control target value input from an outside; and when it is determined that the space is formed, the control unit may lengthen a period for the current conduction to the drive unit, compared to when it is determined that the space is not formed.

In the case of (2), when no space is formed between the drive member and the operated element, the reaction force output device can transmit the reaction force to the operated element on the basis of the control target value corresponding to, for example, external information such as a traveling speed. Also, when the space is formed, the space is removed by longtime current conduction. Therefore, the reaction force output device can transmit information to a user via the operated element.

(3) In the aspect of (2), when it is determined that the space is not formed, the control unit may alternately provide a period for which the drive unit is driven by pulse width modulation (PWM) control and a period for which the current conduction to the drive unit is stopped.

Here, for example, if no space is formed between the drive member and the operated element, when the driving force of the drive unit is controlled by the PWM control, a closed circuit may be maintained even in an open section of a pulse due to a circuit characteristic such as regeneration caused by a diode in a circuit, and an adequate driving force may not be output.

In the case of (3), since the period for which the current conduction to the drive unit is stopped is provided in addition to the period for which the drive unit is driven by the PWM control, it is possible to avoid the above phenomenon in which the closed circuit is maintained. Therefore, the drive unit can output the adequate driving force.

(4) In any one of the aspects of (1) to (3), the drive unit may be a rotary electric motor, and the control unit may determine whether or not the space is formed between the operated element and the drive member on the basis of a degree of delay of rotation of the drive unit.

In the case of (4), the reaction force output device detects a delay of rotation of a real electric motor with respect to rotation of an electric motor which is expected based on current conduction. The rotation of the electric motor and the movement of the drive member are associated with each other, and if the movement of the drive member is restrained, the rotation of the electric motor is hindered. Also, the movement of the drive member is hindered by operation of the operated element. For this reason, while the operated element is being operated, the rotation of the electric motor is hindered and delayed. Therefore, the degree of delay of the electric motor is detected, and thereby it is possible to easily determine whether or not the space is formed between the operated element and the drive member without measuring a real distance between the operated element and the drive member, and to control the output driving force of the drive unit.

(5) In any one of the aspects of (1) to (3), the control unit may determine whether or not the space is formed between the operated element and the drive member on the basis of a change in consumption current which the drive unit consumes.

In the case of (5), the reaction force output device detects a value of the consumption current which the drive unit consumes based on current conduction. For example, when the rotary electric motor of the drive unit is rotated, since the current conduction path of a circuit is switched inside the drive unit according to the rotation, the consumption current is reduced. When the electric motor is not rotated, since a current continues to flow along the same path, the consumption current is increased. As described above, the rotation of the electric motor is hindered by restraint of the movement of the drive member due to the operated element. Accordingly, the consumption current of the electric motor is detected, and thereby it is it is possible to easily determine whether or not the space is formed between the operated element and the drive member without measuring the real distance between the operated element and the drive member.

(6) In any one of the aspects of (1) to (3), the control unit may determine whether or not the space is formed between the operated element and the drive member on the basis of an input amount of operation of the operated element and displacement of the drive member which is caused by the drive unit.

In the case of (6), since it is determined whether or not the space is formed between the operated element and the drive member on the basis of the amount of operation indicating the position of the operated element and the displacement of the drive member which indicates the position of the drive unit, it is possible to accurately determine whether or not to drive the drive member with greater output.

Advantageous Effects of Invention

According to the aspect of the present invention, it is possible to provide the reaction force output device capable of improving followability.

BRIEF DESCRIPTION OF DRAWINGS

FIG. 8 is a flow chart illustrating an example of current conduction control processing of the reaction force output device according to the present embodiment.

DESCRIPTION OF EMBODIMENTS

Hereinafter, embodiments of the present invention will be described with reference to the drawings. A reaction force output device in each embodiment is a device for outputting a force (reaction force) in a direction opposite to that of a pedaling force to an operated element, such as an accelerator pedal, installed to instruct acceleration of a vehicle, thereby improving an acceleration feeling, transmitting the reaction force to urge acceleration work in which fuel consumption is saved, or performing various safety controls. The safety controls include control of outputting a relatively great reaction force to inhibit excessive acceleration, for instance, in front of curves, urban districts, or school zones. Also, when a rapid operation of the accelerator pedal exceeding criteria is simply performed, this is determined to be an erroneous operation, and control of outputting a great reaction force may be performed. The operated element includes an operating device such as a brake pedal, a steering wheel, or a game machine in addition to the accelerator pedal.

First Embodiment

Figure 1:
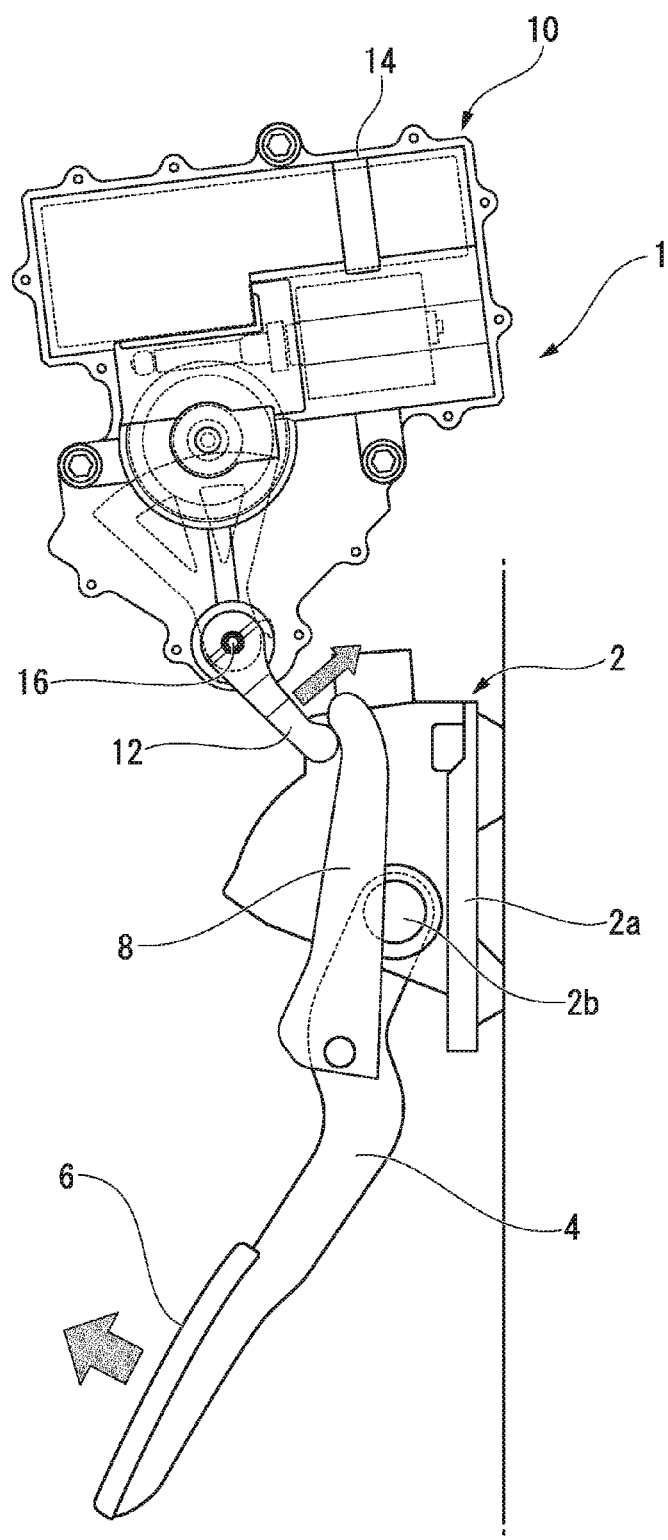
FIG. 1 is a view illustrating an example of an external constitution of an accelerator pedal device equipped with a reaction force output device according to a first embodiment of the present invention.

FIG. 1 is a view illustrating an example of an external constitution of an accelerator pedal device 1 equipped with a reaction force output device 10 according to a first embodiment. The accelerator pedal device 1 is equipped with a pedal body unit 2 installed in front of a footing for a driver seat, and a reaction force output device (drive unit) 10 installed above the pedal body unit 2 in front of the footing for the driver seat.

The pedal body unit 2 is equipped with a holding base 2a mounted on a vehicle body, a pedal arm 4 whose base end is pivotably supported on a support shaft 2b provided for the holding base 2a, and a pedal body part 6 to which a pedaling force is applied by a driver. The holding base 2a is provided with a return spring (not illustrated) that always biases the pedal arm 4 to an initial position. A cable (not illustrated) for operating the degree of opening of a throttle valve (not illustrated) in an internal combustion engine (engine) according to an operation amount (pivotal angle) of the pedal arm 4 is connected to the pedal arm 4. However, when an electronic control throttle is used in the internal combustion engine, the pedal body unit 2 may be provided with a rotation sensor for detecting the pivotal angle of the pedal arm 4, and be configured to control the degree of opening of the throttle valve on the basis of a detected signal of the rotation sensor. Also, a reaction force transmission lever 8 extending roughly in a direction opposite to a direction in which the pedal arm 4 extends is integrally coupled in the vicinity of the base end of the pedal arm 4. Moreover, a tip portion of an output lever 12 that is a drive member of the reaction force output device 10 and a tip portion of the reaction force transmission lever 8 can abut each other. A pivoting force of the output lever 12 that is the drive member of the reaction force output device 10 is output to the pedal arm 4 via the reaction force transmission lever 8. In this way, the reaction force output device 10 outputs a reaction force in a direction opposite to that of the pedaling force to the operated element (e.g., the reaction force transmission lever 8).

Figure 2:
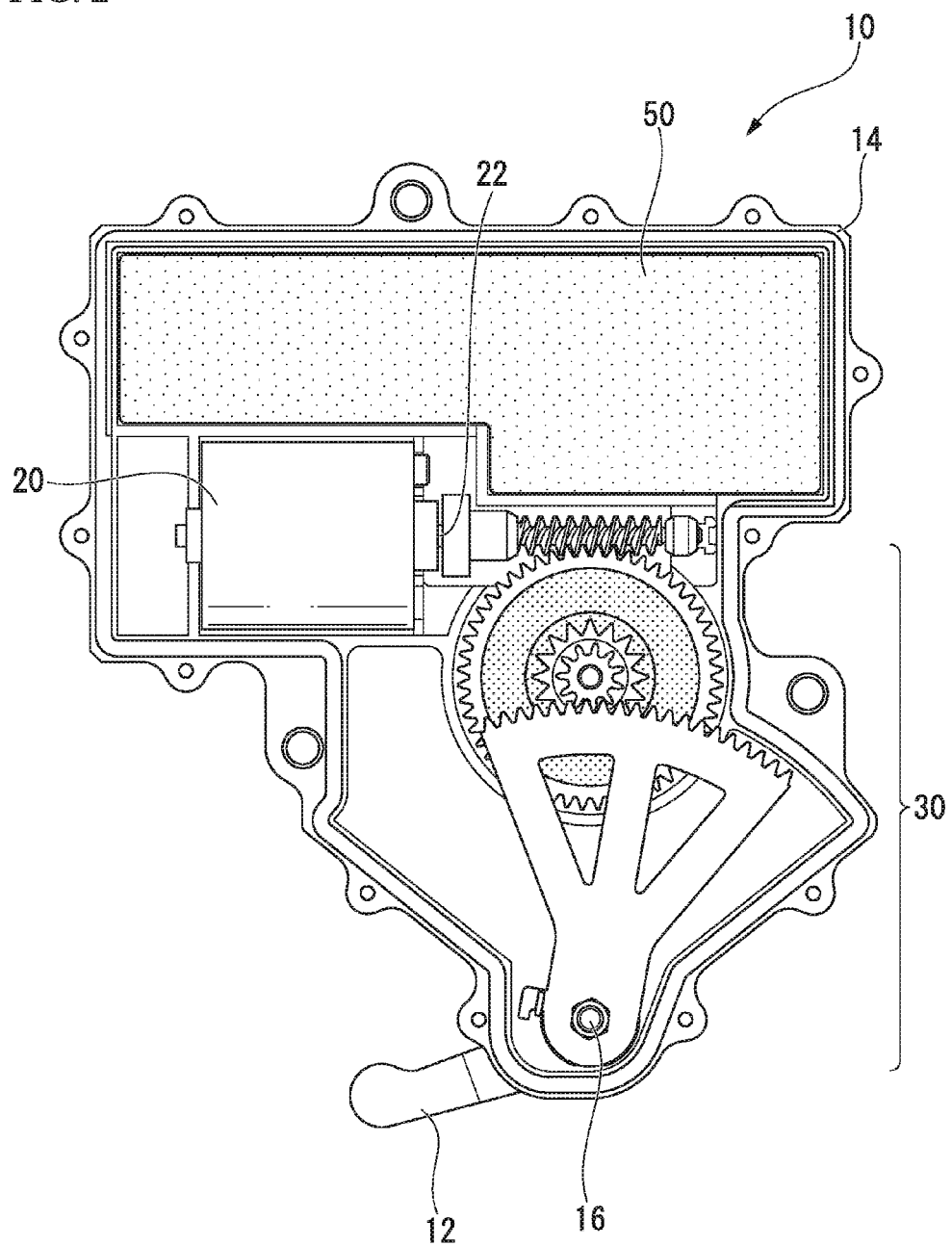
FIG. 2 is a view illustrating an example of an internal structure of the reaction force output device according to the present embodiment.

FIG. 2 is a view illustrating an example of an internal structure of the reaction force output device 10. A state in which a housing cover of a housing 14 formed of a resin is removed is illustrated in FIG. 2. The reaction force output device 10 is equipped with a motor (electric motor) (drive unit) 20 that is a drive source for generating the reaction force, a reaction force output shaft 16 that is pivotably supported by the housing 14, and a gear reduction mechanism 30. The gear reduction mechanism 30 decelerates rotation of a rotor of the motor 20 to increase torque, and deflects the rotation from a rotating shaft 22 of the motor in a direction of the reaction force output shaft 16 to transmit the rotation to the output lever 12. One end in the direction of the reaction force output shaft protrudes outward from a lateral surface of the housing 14, and the output lever 12 is integrally connected to the protruding end.

The rotation of the rotor of the motor 20 is controlled by a control circuit mounted on a circuit board 50. A controller area network (CAN) cable (not illustrated) for transmitting and receiving a signal by means of a host electronic control unit (ECU) to be described below and the control circuit is connected to the circuit board 50. Also, the circuit board 50 and the motor 20 are connected via a cable, and the rotation of the rotor of the motor 20 is controlled on the basis of the control signal transmitted from the circuit board 50. Also, a case covering the rotor of the motor 20 is provided with small holes, and Hall integrated circuits (ICs) are fitted into and installed in the small holes. The Hall ICs detect intensities of magnetic flux passing through the small holes, and output voltages corresponding to the detected intensities of magnetic flux. Since the intensities of magnetic flux which are detected by the Hall ICs vary depending on the rotation of the rotor in the motor 20, an amount of the rotation of the rotor can be detected on the basis of the output voltages of the Hall ICs. Hereinafter, a state in which three Hall ICs are installed will be described as an example, but the Hall ICs may number two, four or more.

Figure 3:
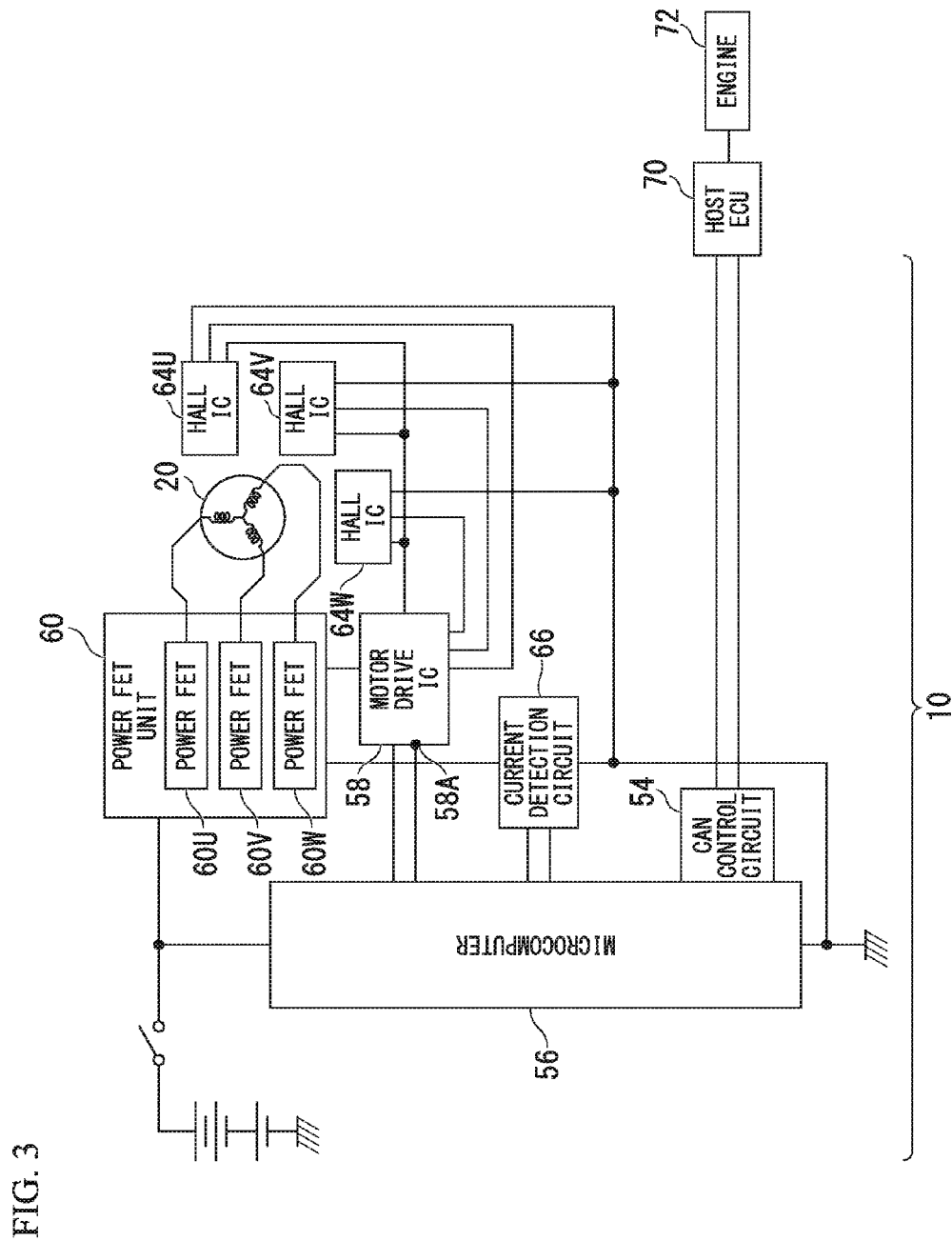
FIG. 3 is a view illustrating an example of a functional constitution centered on a control circuit of the reaction force output device according to the present embodiment.

FIG. 3 is a view illustrating an example of a functional constitution centered on a control circuit of the reaction force output device 10. In FIG. 3, the reaction force output device 10 is equipped with the motor 20, a CAN control circuit 54 that performs CAN communication with the host ECU 70, a microcontroller (microcomputer) 56 (control unit), a motor drive IC (control unit) 58, a power field effect transistor (FET) 60, Hall ICs (control units) 64U, 64V and 64W, and a current detection sensor 66. Hereinafter, the three Hall ICs may be referred to collectively as the Hall IC 64.

The host ECU 70 controls, for example, the degree of opening of the throttle valve according to an amount of operation of the pedal arm 4, thereby performing drive control of an engine 72. In the engine 72, a crankshaft that is an output shaft is connected to an axle, and outputs a traveling drive force of a vehicle. A traveling drive unit may have a constitution in which a traveling motor is added to the engine 72 or a constitution in which the traveling drive force is output only by the traveling motor without the engine 72.

The microcomputer 56 performs the CAN communication with the host ECU 70 via the CAN control circuit 54. The microcomputer 56 receives a reaction force setting value, which serves as a basis of magnitude of the reaction force generated by the reaction force output device 10, from the host ECU 70. The microcomputer 56 controls the motor drive IC 58 on the basis of the reaction force setting value received from the host ECU 70, and controls current conduction to the power FET 60.

The microcomputer 56 performs pulse width modulation (PWM) control of the power FET 60 on the motor drive IC 58 using a duty ratio corresponding to the reaction force setting value. The power FET 60 includes the power FETs 60U, 60V and 60W for respective U, V and W phases, and the power FETs are connected to respective coils of corresponding phases of the motor 20. The motor drive IC 58 cyclically turns on/off the power FET of each phase, thereby generating a magnetic field at the coil of each phase to rotate the rotor of the motor 20.

Also, the microcomputer 56 performs control by cyclically switching a period for which the PWM control is performed and a period for which all the power FETs 60U, 60V and 60W are turned off at the same time. The motor drive IC 58 is equipped with an input terminal 58a for receiving input of a signal (hereinafter referred to as "all-off signal") that turns off all the power FETs 60U, 60V and 60W.

Figure 4:
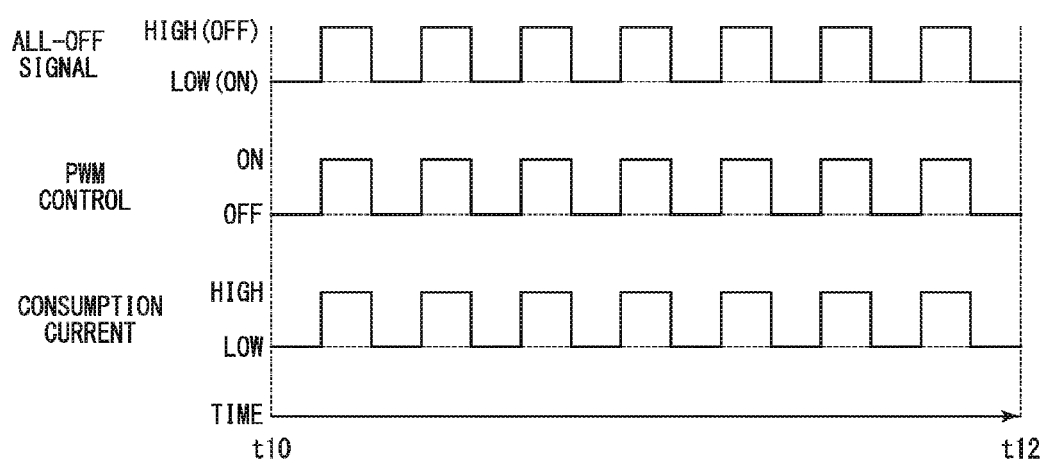
FIG. 4 is a view schematically illustrating basic control conducted by a microcomputer of the reaction force output device according to the present embodiment.

FIG. 4 is a view schematically illustrating basic control conducted by the microcomputer 56. In this figure, a time elapses from t10 to t12. The microcomputer 56 intermittently outputs the all-off signal to the input terminal 58a of the motor drive IC 58. When the all-off signal is input by, for instance, LOW assert, and the all-off signal is HIGH, the motor drive IC 58 conducts a current to the power FET 60 to perform the PWM control (PWM control on). Also, when the all-off signal is LOW, the motor drive IC 58 does not conduct the current to any of the power FETs 60U, 60V and 60W (PWM control off). While the current conduction to the power FET 60 is performed, the motor 20 is driven, and a current is consumed. Hereinafter, intermittently controlling the current conduction to the motor 20 as described above is sometimes called intermittent control. Hereinafter, the three power FETs may also be referred to collectively as the power FET 60.

The control as illustrated in FIG. 4 is performed under the following circumstances. If the reaction force output device 10 is made up of the motor 20 driven by the coils, the power FETs, and so on, torque when the pedal arm 4 is pressed may be increased by an increase in friction torque occurring at the closed circuit of the motor 20, and the reaction force may be excessive. In contrast, if the PWM control in which the duty ratio is not 100% is performed, the motor 20 will be an open circuit in an off section of a pulse, but it may maintain the closed circuit without the current being dissipated due to regeneration or an additional component based on a diode of the power FET 60. For this reason, it is necessary to simultaneously turn off all the power FETs 60U, 60V and 60W and to provide the period for which the PWM control is not performed.

However, when the control as illustrated in FIG. 4 is performed, this may incur output shortage of the reaction force output device 10 due to the presence of the period for which the PWM control is not performed. As a result, for example, immediately after a driver separates his/her foot from the pedal body part 6 from a state in which he/she has pressed the pedal body part 6, the rotation of the motor 20 cannot follow a return of the pedal arm 4, and for example, a space may be formed, or exist, between a tip portion of the output lever 12 and a tip portion of the reaction force transmission lever 8. In this way, if such a space is formed or exists between the output lever 12 driven by the motor 20 and the reaction force transmission lever 8, the motor 20 cannot immediately output the reaction force to the pedal arm 4 (deterioration of followability). As a result, when pressing the pedal arm 4 next, a driver may feel a change in acceleration without feeling the reaction force.

In contrast, the reaction force output device 10 of the present embodiment determines whether or not a space is formed, or exists, at a connecting structure between the output lever 12 and the pedal body part 6 (in the present embodiment, particularly between the output lever 12 and the reaction force transmission lever 8), and controls the output of the motor 20 according to the determined result. Thereby, the deterioration of the followability as described above is suppressed. This will be described below.

The current detection sensor 66 and the motor drive IC 58 are connected to the microcomputer 56. The microcomputer 56 receives information about consumption current of the motor 20 from the current detection sensor 66. In addition to the microcomputer 56, the three Hall ICs 64U, 64V and 64W are connected to the input terminal of the motor drive IC 58. The motor drive IC 58 receives a change in voltage which each of the Hall ICs 64U, 64V and 64W outputs. The motor drive IC 58 outputs information about an amount of rotation of the rotor of the motor 20 to the microcomputer 56 on the basis of the input from the Hall ICs 64U, 64V and 64W.

The microcomputer 56 receives the information about the amount of rotation of the rotor of the motor 20 based on the detected result of the Hall IC 64 via the motor drive IC 58 (or indirectly from the Hall IC 64). In the present embodiment, the microcomputer (control unit) 56 determines whether or not a space is formed at the connecting structure between the output lever (drive member) 12 of the reaction force output device (drive unit) 10 and the pedal body part (operated element) 6, i.e., whether or not a space is formed between the output lever (drive member) 12 and the reaction force transmission lever (operated element) 8 in the case of the present embodiment, on the basis of the detected results of the Hall ICs (control units) 64U, 64V and 64W. When it is determined that the space is formed, the motor drive IC (control unit) 58 performs the current conduction to the power FET 60 for a longer time than when it is determined that no space is formed. Thereby, in comparison with when it is determined that no space is formed, a greater driving force is output to the output lever 12, and the output lever 12 approaches and abuts the reaction force transmission lever 8 more quickly. As a result, the followability by which the reaction force output device 10 follows the pedal body part 6 is improved. Also, when it is determined that no space is formed, the motor drive IC 58 performs the PWM control over the current conduction to the power FET 60 with the duty ratio corresponding to the reaction force setting value. Thereby, the reaction force output device 10 outputs an adequate reaction force to a pedal device.

Hereinafter, a space determining method based on the detected result of the Hall IC 64 will be described. As described in FIG. 1, a turning force of the output lever 12 that is the drive member of the reaction force output device 10 is output to the pedal arm 4 via the reaction force transmission lever 8, and the reaction force is given to the pedal body part 6. On the other hand, a pedaling force applied to the pedal body part 6 gives a force in a direction opposite to a turning direction of the output lever 12 to the output lever 12 via the pedal arm 4 and the reaction force transmission lever 8. Thus, since the turning force of the output lever 12 is obtained by forward rotation of the rotor of the motor 20, the pedaling force applied to the pedal body part 6 acts as an external load that hinders the forward rotation of the rotor of the motor 20. That is, when the reaction force transmission lever 8 and the output lever 12 are in contact with each other (no space is formed), the rotation of the rotor of the motor 20 is hindered in response to the pedaling force. When the reaction force transmission lever 8 and the output lever 12 are not in contact with each other (the space is formed), the rotation of the rotor of the motor 20 is not hindered. Accordingly, when a rotating speed is slower than a preset rotating speed caused by a drive signal given to the motor 20, it can be determined that no space is formed at the connecting structure between the output lever 12 and the pedal body part 6 (the output lever 12 and the pedal arm 4 are in contact with each other). When there is no delay or the degree of delay is small, it can be determined that the space is formed at the connecting structure between the output lever 12 and the pedal body part 6. The microcomputer 56 performs long-term current conduction (to be described below) in a predetermined cycle, and detects presence or absence of the space.

Figure 5:
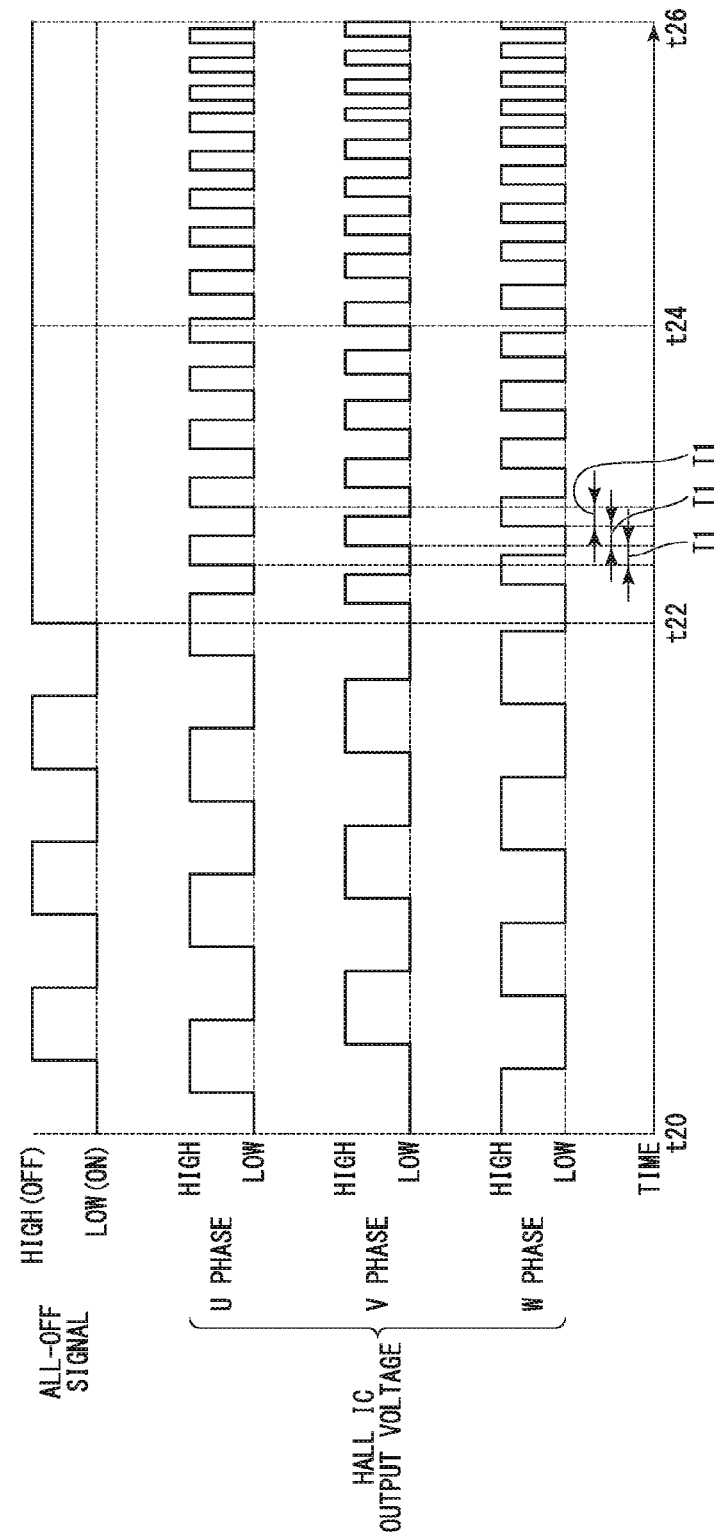
FIG. 5 is a view illustrating an example of a detected signal from a Hall IC of the reaction force output device according to the present embodiment in a situation in which there is no external load on a motor.

Here, an influence of the external load (pedaling force) on the detected result of the Hall IC 64 will be described using FIGS. 5 to 7. In the graphs illustrated in FIGS. 5 to 7, it is assumed that all conditions other than presence or absence of the external load are the same. FIG. 5 is a view illustrating an example of a detected signal from the Hall IC 64 in a situation in which there is no external load on the motor 20 (or the load is small). In the example of FIG. 5, time elapses from a time t20 to a time t26. A time t22 indicates a time when the microcomputer 56 starts detection of the external load. Also, a time t24 indicates a time when the microcomputer 56 starts control corresponding to the presence or absence of the external load. Since an all-off signal based on, for example, the reaction force setting value is intermittently input into the motor drive IC 58 that controls a period (from the time t20 to the time t22) until the start of detection and the power FET 60, the rotation of the rotor of the motor 20 is suppressed. During a detecting period (from the time t22 to the time t24) of the external load, current conduction for a time longer than a time for intermittent control (hereinafter referred to as longtime current conduction control) is performed on the power FET 60. In the example of FIG. 5, since there is no external load, the rotating speed of the rotor of the motor 20 increases, a time difference T1 between phases becomes smaller than a predetermined time (in other words, the rotating speed becomes faster than the preset rotating speed). This predetermined time may be set as a constant value, or may be variable depending on the number of revolutions of the rotor of the motor 20. Therefore, the microcomputer 56 determines that there is no external load, and continues the longtime current conduction control even after termination of the detecting period (from the time t24 to the time t26). As a result, a greater driving force than when it is determined that no space is formed is output to the output lever 12, and the output lever 12 approaches and abuts the reaction force transmission lever 8 more rapidly. In FIG. 5, an example in which, during the detecting period (from the time t22 to the time t24) and after the termination of the detecting period (from the time t24 to the time t26), the current conduction is always performed on the motor 20 is illustrated. However, without being limited thereto, for example, a ratio of the current conduction time to an all-off period may be set to be longer than the time for intermittent control, and the duty ratio in the PWM control may be set to be greater than the time for intermittent control.

Figure 6:
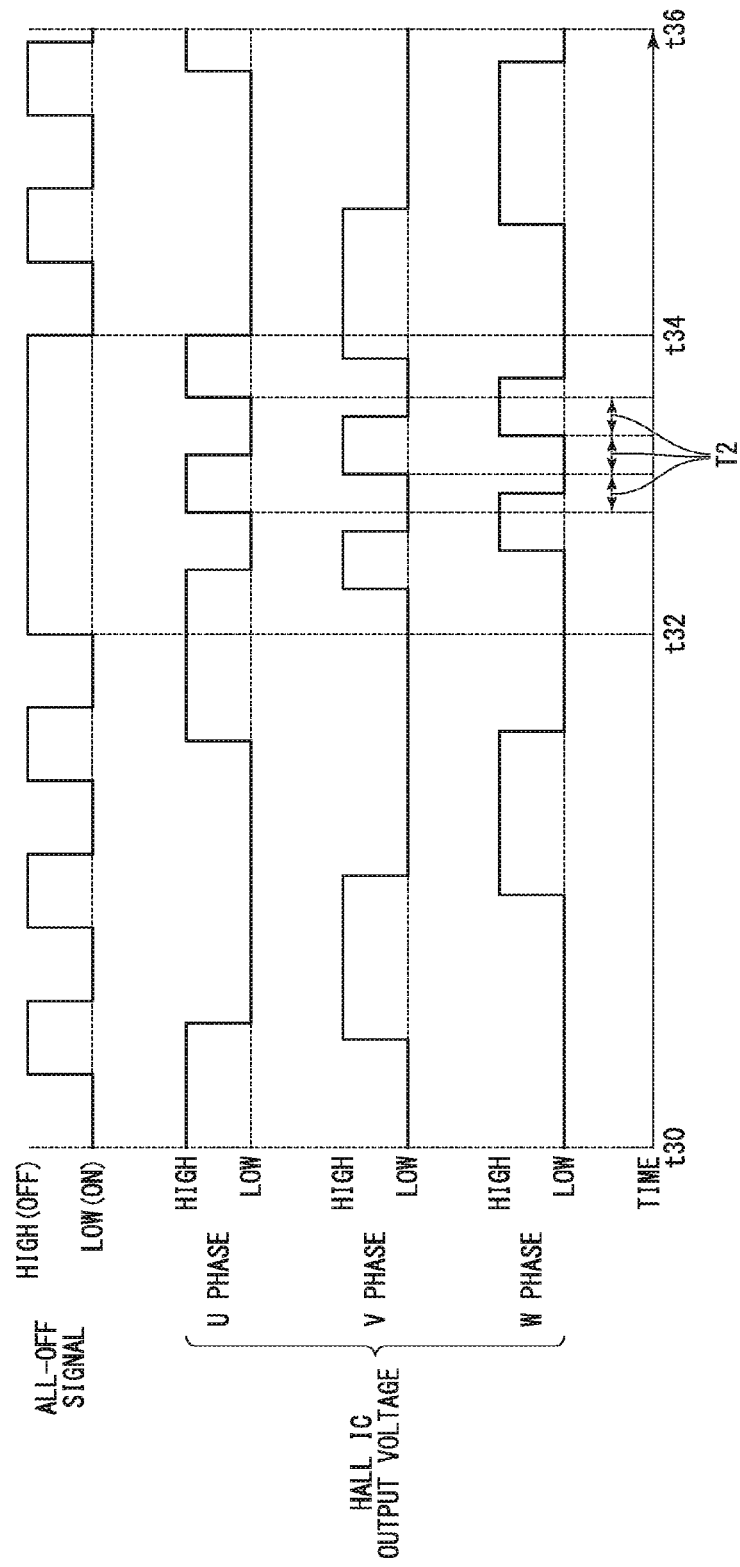
FIG. 6 is a view illustrating an example of a detected signal from the Hall IC of the reaction force output device according to the present embodiment in a situation in which there is an external load on the motor.

FIG. 6 is a view illustrating an example of the detected signal from the Hall IC 64 in a situation in which there is an external load on the motor 20. In the example of FIG. 6, time elapses from a time t30 to a time t36. A time t32 indicates a time when the microcomputer 56 starts detection of the external load. Also, a time t34 indicates a time when the microcomputer 56 starts control corresponding to the presence or absence of the external load. In a detecting period (from the time t32 to the time t34) of the external load, longtime current conduction control is performed as in the example of FIG. 5. However, in the example of FIG. 6, since there is an external load, the rotating speed of the rotor of the motor 20 is limited to a small increase.

When there is an external load on the motor 20, a time difference (delay T2) between phases in the detecting period becomes greater than a predetermined time (in other words, the rotating speed becomes slower than the preset rotating speed). For this reason, after termination of the detecting period (from the time t34 to the time t36), the microcomputer 56 restarts intermittent control. Thereby, the rotation of the rotor of the motor 20 is suppressed, and the reaction force output device 10 does not output a greater reaction force than necessary.

Figure 7:
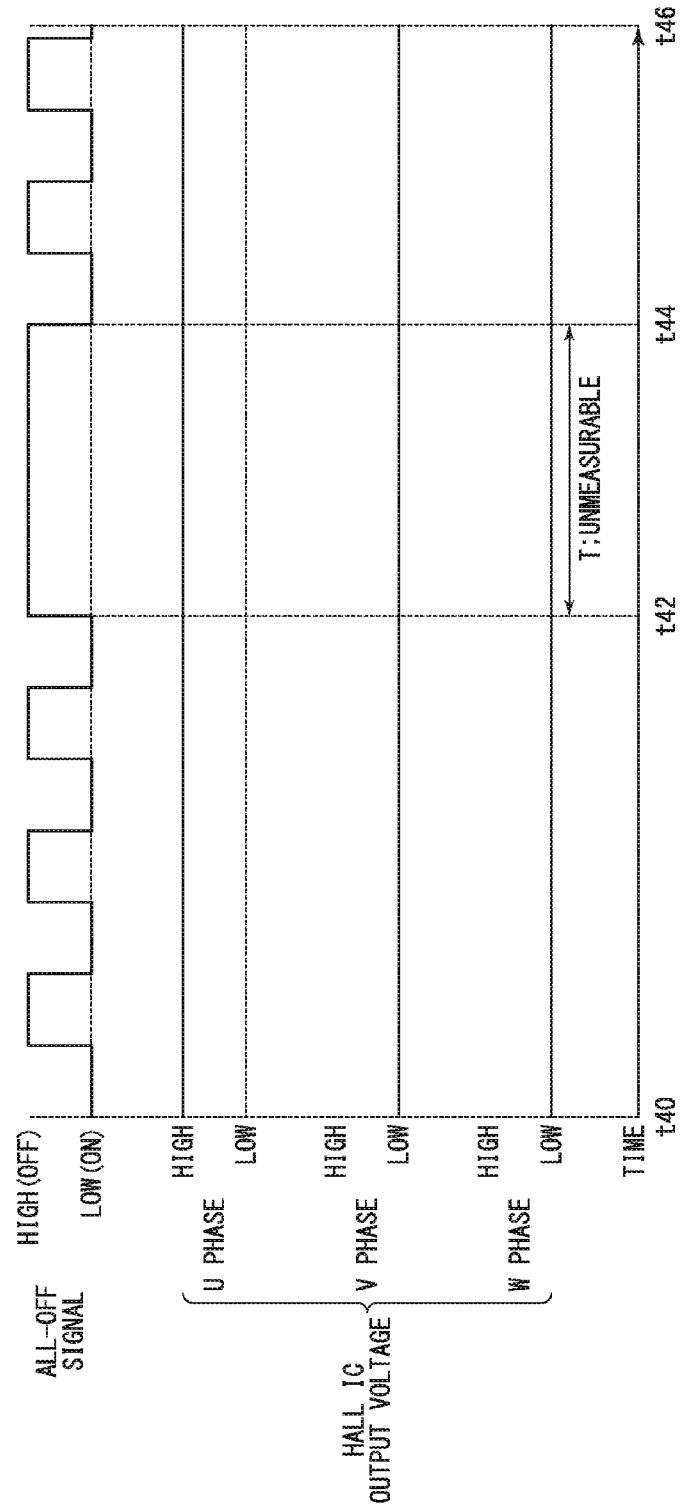
FIG. 7 is a view illustrating another example of the detected signal from the Hall IC of the reaction force output device according to the present embodiment in the situation in which there is an external load on the motor.

FIG. 7 is a view illustrating another example of the detected signal from the Hall IC 64 in a situation in which there is an external load on the motor 20. In the example of FIG. 7, time elapses from a time t40 to a time t46. A time t42 indicates a time when detection of the external load is started. Also, a time t44 indicates a time when control corresponding to the presence or absence of the external load is started. In the example of FIG. 7, in comparison with the situation described using FIG. 6, a situation in which there is a greater external load is shown. Thus, in the example of FIG. 7, even after the microcomputer 56 starts the detection of the external load, an output signal from the Hall IC 64 is only detected from a specific phase (in this example, a U phase). This shows that the rotor of the motor 20 is not rotated at all.

The state illustrated in FIG. 7 occurs, for instance, when the rotation of the rotor of the motor 20 is completely hindered by a strong external load, or when an accelerator pedal is located at a completely closed position, and the output lever 12 does not move any more. Accordingly, when the microcomputer 56 cannot measure a time difference between phases, the microcomputer 56 determines that there is an external load. Therefore, after termination of the detecting period, the microcomputer 56 restarts intermittent control. While not described here, when a greater external load is given to the reaction force output device 10, the rotor of the motor 20 may be reversely rotated. In this case, an order of outputs from the each phase of the Hall IC 64 is reversed. The microcomputer 56 may determine that the external load is applied by detecting this.

FIG. 8 is a flow chart illustrating an example of current conduction control processing based on output voltage of the Hall IC 64. First, the microcomputer 56 determines whether or not a detection timing (for example, intervals of 100 milliseconds) of the external load has come (step S100). When the detection timing has not come (NO in step S100), the process proceeds to RETURN. When the detection timing has come (YES in step S100), the microcomputer 56 controls the motor drive IC 58 such that the power FET 60 is subjected to current conduction for a long time, and attempts to drive the motor 20 (step S102). Next, the motor drive IC 58 receives output voltage from each of the Hall ICs 64U, 64V and 64W (step S104). Next, the motor drive IC 58 determines whether or not a time difference between phases based on output voltage output from each phase of the Hall IC 64 is greater than a predetermined time (for example, 20 milliseconds) (step S106). When the time difference between phases is greater than the predetermined time (YES in step S106), the motor drive IC 58 determines that there is an external load, i.e., no space is formed at the connecting structure between the output lever 12 and the pedal body part 6 (step S108), and restarts the intermittent control (step S110). When the time difference between phases is not greater than the predetermined time (NO in step S106), the motor drive IC 58 determines that there is no external load, i.e., the space is formed at the connecting structure between the output lever 12 and the pedal body part 6 (step S112), and maintains longtime current conduction control, and thereby drives the motor 20 with a greater driving force to cause the output lever 12 to follow the reaction force transmission lever 8 (step S114).

As described above, according to the reaction force output device 10 of the present embodiment, the microcomputer 56 determines whether or not the space is formed at the connecting structure between the output lever 12 and the pedal body part 6, and when it is determined that the space is formed, the microcomputer 56 controls the motor 20 to output a greater driving force than when it is determined that no space is formed. Thus, it is possible to increase followability of the output lever 12 to the reaction force transmission lever 8.

Also, the microcomputer 56 performs intermittent current conduction to the motor 20, and thereby controls the motor 20. Thus, it is possible to inhibit the reaction force from excessively increasing.

Also, the microcomputer 56 determines whether or not the space is formed at the connecting structure between the output lever 12 and the pedal body part 6 on the basis of the degree of delay of the rotation of the rotor of the motor 20 which is detected by the Hall IC 64. Thus, it is possible to control the current conduction without adding a new component.

Second Embodiment

Hereinafter, a second embodiment of the present invention will be described with reference to the drawings. A reaction force output device in the second embodiment determines whether or not a space is formed between a drive member and an operated element on the basis of consumption current of a motor 20 instead of output voltage of a Hall IC 64. In the present embodiment, the same sign as in the first embodiment is used for each component, and description of the same function will be omitted.

Figure 9A:
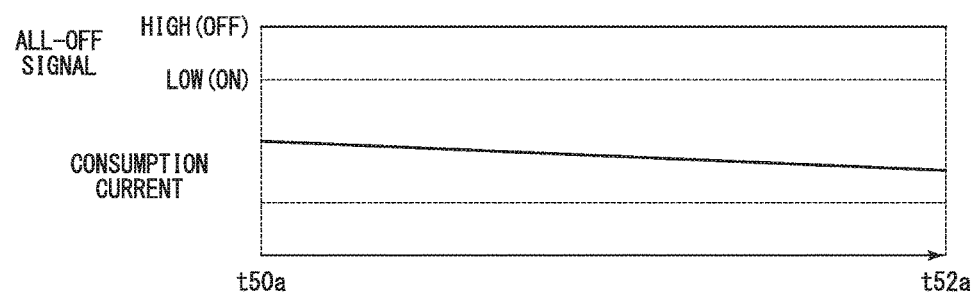
FIG. 9A is a view for describing an example of an influence of the external load on a consumption current of the motor of a reaction force output device according to a second embodiment of the present invention.
Figure 9B:
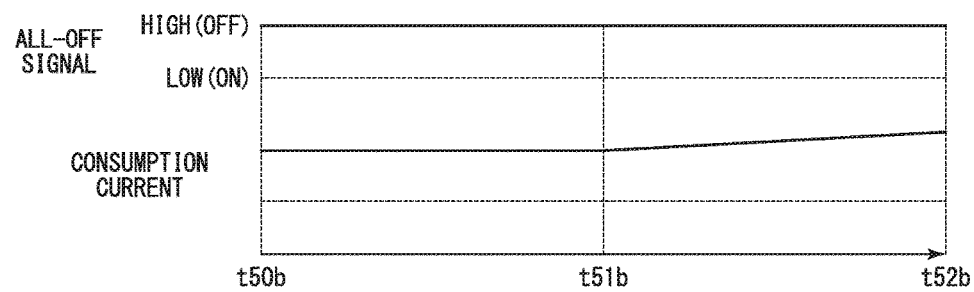
FIG. 9B is a view for describing the example of the influence of the external load on the consumption current of the motor of the reaction force output device according to the second embodiment of the present invention.

FIGS. 9A and 9B are views for describing an example of an influence of an external load on the consumption current of the motor 20 in a detecting period of the external load. FIG. 9A illustrates an example of a detected signal from a current detection sensor 66 in a situation in which there is no external load on the motor 20. Time elapses from a time t50a to a time t52a. Also, FIG. 9B illustrates an example of a detected signal of the current detection sensor 66 in a situation in which there is an external load on the motor 20. Time elapses from a time t50b to a time t52b. Also, in the graphs illustrated in FIGS. 9A and 9B, it is assumed that all conditions other than presence or absence of the external load are the same.

As described above, the pedaling force given to the pedal body part 6 reduces the rotating speed of the rotor of the motor 20. A change in the rotating speed may be detected, for instance, as an increase in the consumption current of the motor 20 in addition to a time difference in output time of output voltage of each phase of the Hall IC 64. For example, when longtime current conduction is performed on the motor 20, the rotor of the motor 20 is rotated when there is no external load (FIG. 9A), and the current conduction is rapidly switched by a power FET 60 in the order of three phases, U, V and W phases. Since each current conduction phase is equipped with a coil, when the current conduction is performed via a specific current conduction phase, the consumption current of the motor 20 increases with the lapse of time. Also, when the current conduction phase is switched, the increase of the consumption current is reset. A switching speed of the current conduction phase and the rotating speed of the rotor of the motor 20 are interlocked. When there is no external load, the rotating speed of the rotor of the motor 20 becomes fast with the lapse of time (from a time t50a to a time t52a), and the current conduction phase is rapidly switched. Thus, the consumption current is gradually reduced.

On the other hand, when there is an external load (FIG. 9B), the rotation of the rotor of the motor 20 is hindered. For example, the rotor of the motor 20 is slowly rotated in an initial stage of the current conduction, and the rotation thereof is stopped after a certain time (time t51b). In this case, in a period (from the time t50b to the time t51b) in which the rotor of the motor 20 is slowly rotated, the current conduction phase is slowly switched, and thus the consumption current hardly changes. Thus, in a period (from the time t51b to a time t52b) after the rotation is stopped, since the switching of the current conduction phase does not take place, the consumption current increases. In this way, for example, the consumption current of the motor 20 is detected, and it is determined whether or not the consumption current is equal to or more than a threshold value. Thereby, it is possible to easily determine whether or not the output lever 12 is pressed against the reaction force transmission lever 8, i.e., whether or not the space is formed at the connecting structure between the output lever 12 and the pedal body part 6.

Figure 10:
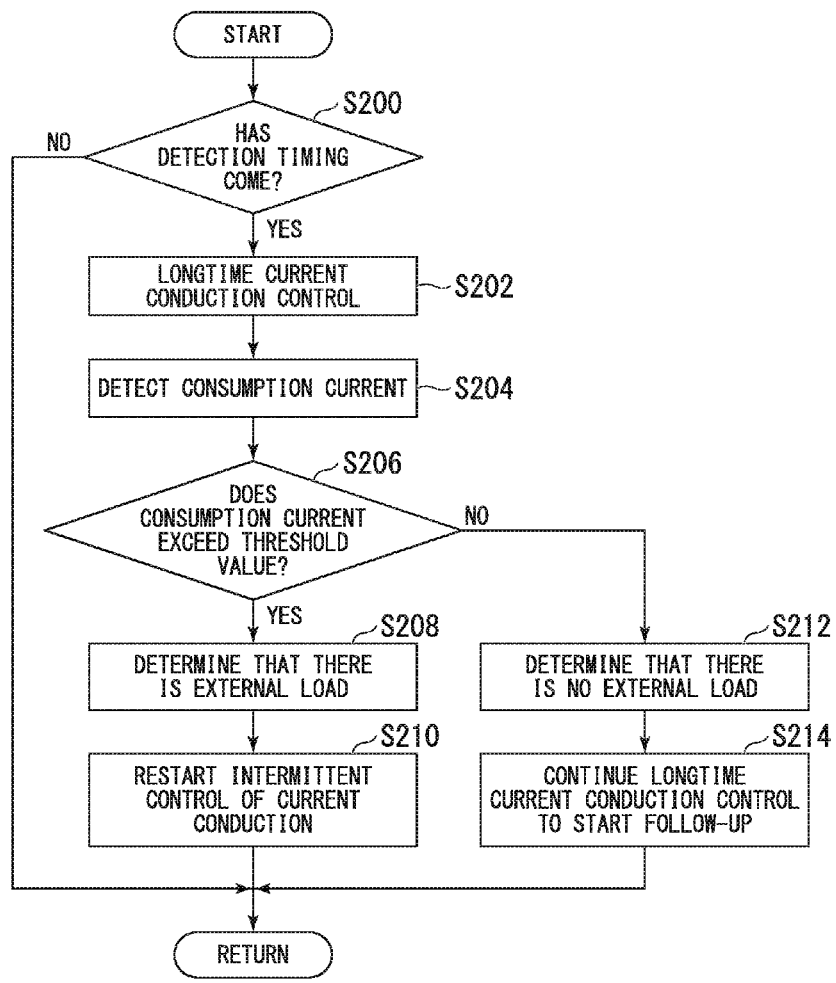
FIG. 10 is a flow chart illustrating an example of current conduction control processing of the reaction force output device according to the present embodiment.

FIG. 10 is a flow chart illustrating an example of current conduction control processing based on the consumption current of the motor 20. Since this flow chart is equivalent to the operation described using FIG. 8 of the first embodiment, and steps S200, S202, S208, S210, S212 and S214 of FIG. 10 are the same processes of steps S100, S102, S108, S110, S112 and S114 of FIG. 8, description thereof will be omitted. In step S204, the current detection sensor 66 detects the consumption current of the motor 20, and outputs the detected information to a microcomputer 56. Next, the microcomputer 56 determines whether or not the consumption current of the motor 20 which is detected by the current detection sensor 66 is equal to or more than a predetermined threshold value (step S206). When the consumption current is equal to or more than the threshold value (YES in step S206), the process transitions to step S208. When the consumption current is less than the threshold value (NO in step S206), the process transitions to step S212.

As described above, according to the reaction force output device 10 of the present embodiment, the same effects as the effects described in the first embodiment can be obtained. Also, the microcomputer 56 determines whether or not the space is formed at the connecting structure between the output lever 12 and the pedal body part 6 on the basis of a change in the consumption current which the motor 20 consumes, and thus it is possible to control the current conduction without adding a new component.

Third Embodiment

Hereinafter, a third embodiment of the present invention will be described with reference to the drawings. A reaction force output device 10 according to the present embodiment determines whether a space is formed at a connecting structure between an output lever 12 and a pedal body part 6 on the basis of an amount of rotation of a rotor of a motor 20 and a turning angle of a pedal arm 4 which is input from, for instance, a vehicle side, i.e., an amount of operation of a pedal. In the present embodiment, the same sign as in the first and second embodiment is used for each component, and description of the same function will be omitted.

A motor drive IC 58 in the present embodiment detects the amount of rotation of the rotor of the motor 20 on the basis of output voltages from each of three Hall ICs 64. The number of times which the output voltages of the Hall IC 64 are output reflects the amount of rotation of the rotor of the motor 20. Also, the order in which the output voltages are output from each phase of the Hall IC 64 reflects a direction in which the rotor of the motor 20 rotates. For example, when the output voltages of the Hall IC 64 are detected in the order of U, V, W and U phases, the rotor of the motor 20 rotates in a forward direction, and the output lever 12 is driven in a direction of a reaction force transmission lever 8. Also, for example, when the output voltages from the Hall IC 64 is detected in the order of U, W, V and U phases, the rotor of the motor 20 rotates in a reverse direction, and the output lever 12 is driven in the opposite direction of the reaction force transmission lever 8. In this way, since the motor drive IC 58 can accurately detect the amount of rotation of the rotor of the motor 20 on the basis of the number of times which the output voltages from the Hall IC 64 are output and the order in which the output voltages are detected from the each phase, the motor drive IC 58 can calculate displacement, i.e., a position, of the output lever 12. The motor drive IC 58 outputs information representing the calculated position of the output lever 12 to a microcomputer 56.

The turning angle of the pedal arm 4 is detected, for instance, by a rotation sensor installed on the pedal arm 4, and is output to a host ECU 70. Also, the host ECU 70 outputs information representing the turning angle of the pedal arm 4 to the microcomputer 56. The turning of the pedal arm 4 changes a position of the reaction force transmission lever 8 connected to the pedal arm 4. Therefore, a change in the position of the reaction force transmission lever 8 is decided by the turning angle of the pedal arm 4, and the microcomputer 56 can calculate the position of the reaction force transmission lever 8. The microcomputer 56 determines whether or not the output lever 12 and the reaction force transmission lever 8 are in contact with each other on the basis of the amount of rotation of the rotor of the motor 20 which is input from the motor drive IC 58 and the turning angle of the pedal arm 4 which is input from the host ECU 70.

Figure 11:
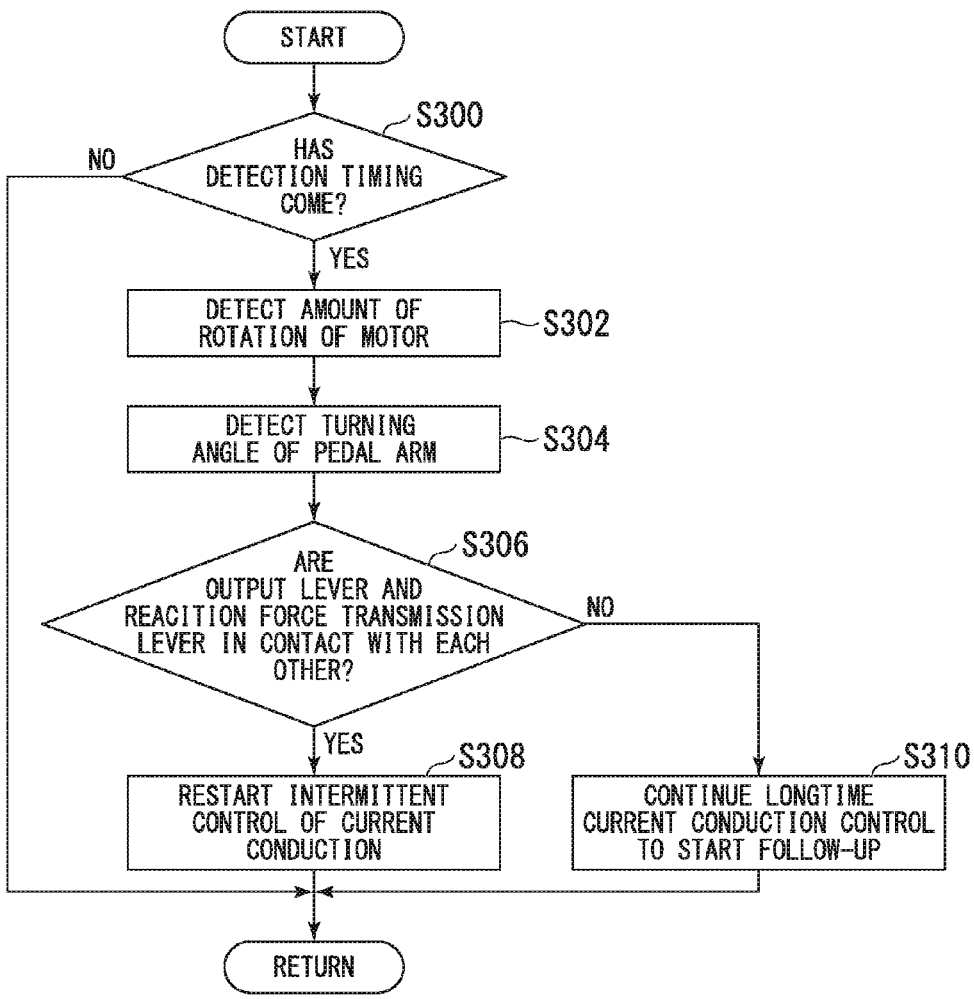
FIG. 11 is a flow chart illustrating an example of current conduction control processing of a reaction force output device with which a vehicle is equipped according to a third embodiment of the present invention.

FIG. 11 is a flow chart illustrating an example of current conduction control processing based on the amount of rotation of the rotor of the motor 20 and the turning angle of the pedal arm 4. Since this flow chart is equivalent to the operation described using FIG. 8 of the first embodiment, and steps S300, S308 and S310 of FIG. 11 are the same as steps S100, S110 and S114 of FIG. 8, description thereof will be omitted. First, the motor drive IC 58 detects the amount of rotation of the rotor of the motor 20 on the basis of the number of times which the output voltages from the three Hall ICs 64 are output and the order in which the output voltages are detected in the each phase, and outputs the detected result to the microcomputer 56 (step S302). Next, the rotation sensor of the pedal arm 4 detects the turning angle of the pedal arm 4, and outputs the detected result to the host ECU 70. The host ECU 70 outputs the turning angle to the microcomputer 56 (step S304). Next, the microcomputer 56 calculates the position of the output lever 12 from the amount of rotation of the rotor of the motor 20, and calculates the position of the reaction force transmission lever 8 from the turning angle of the pedal arm 4. Then, the microcomputer 56 determines whether or not the output lever 12 and the reaction force transmission lever 8 are in contact with each other (step S306). When the output lever 12 and the reaction force transmission lever 8 are in contact with each other (YES in step S306), the process transitions to step S308. When the output lever 12 and the reaction force transmission lever 8 are not in contact with each other (i.e., are separated from each other) (NO in step S306), the process transitions to step S310.

As described above, according to the reaction force output device 10 of the present embodiment, the same effects as the effects described in the first embodiment can be obtained. Also, since the microcomputer 56 determines whether or not the space is formed at the connecting structure between the output lever 12 and the pedal body part 6 on the basis of the turning angle of the pedal arm 4 which represents an input amount of operation of the pedal arm 4 and the displacement of the output lever 12 of the motor 20, it is possible to control the current conduction without adding a new component.

Although embodiments of the present invention have been described above with reference to the drawings, the specific constitution is not limited to the above embodiments, and various changes in design, or the like are possible without departing from the scope of the present invention.

For example, in each of the above embodiments, the microcomputer 56 is configured to change the period for which the all-off signal is output on the basis of a control target value input from the host ECU 70 to intermittently perform the current conduction to the motor 20, and thereby to control the motor 20. However, the microcomputer 56 may perform control of changing the duty ratio of the PWM control on the basis of the control target value.

Also, the determination of the delay of each output voltage between the phases of the Hall IC 64 in the first embodiment, the determination of the change (increase) of the consumption current of the motor 20 in the second embodiment, the determination of the contact between the output lever 12 and the reaction force transmission lever 8 in the third embodiment, or the like may be performed by the motor drive IC 58 rather than the microcomputer 56.

Also, the determination of whether or not the space is formed at the connecting structure between the output lever 12 and the pedal body part 6 in the first embodiment may be performed on the basis of a length of time that a voltage signal of each phase of the Hall IC 64 lasts. In this case, since the time that the voltage signal lasts is lengthened with a decrease in the rotating speed of the rotor of the motor 20, when it lasts a long time, it may be determined that there is an external load, and the output lever 12 and the reaction force transmission lever 8 are in contact with each other.

REFERENCE SIGNS LIST

1: accelerator pedal device, 2: pedal body unit, 2*a*: holding base, 2*b*: support shaft, 4: pedal arm (operated element), 6: pedal body part (operated element), 8: reaction force transmission lever (operated element), 10: reaction force output device (drive unit), 12: output lever (drive member), 14: housing, 16: reaction force output shaft, 20: motor (drive unit), 22: rotating shaft, 30: gear reduction mechanism, 40: CAN cable, 50: circuit board, 54: CAN control circuit, 56: microcomputer (control unit), 58: motor drive IC (control unit), 60: power FET, 64, 64U, 64V, 64W: Hall IC (control unit), 70: host ECU, 72: engine

The invention claimed is:

1. A reaction force output device comprising:
a drive unit, including a motor, which drives a drive member to output a reaction force for being applied to an operated element operated by an operator in a direction opposite to an operating direction of the operated element, the drive member being movable into and out of engagement with the operated element; and
a control unit, including a microcontroller, which determines whether or not a space exists between the operated element and the drive member, and which controls the drive unit to output a greater driving force when the control unit determines that the space exists than when the control unit determines that the space does not exist.

2. The reaction force output device according to claim 1, wherein:
the motor of the drive unit is an electric motor;
when the control unit determines that the space does not exist, the control unit controls the drive unit by intermittently performing current conduction to the drive unit based on a preset control target value; and
when the control unit determines that the space exists, the control unit lengthens a period for the current conduction to the drive unit, compared to when the control unit determines that the space does not exist.

3. The reaction force output device according to claim 2, wherein, when the control unit determines that the space does not exist, the control unit alternately provides a period for which the drive unit is driven by PWM control and a period for which the current conduction to the drive unit is stopped.

4. The reaction force output device according to claim 1, wherein:
the drive unit is a rotary electric motor; and
the control unit determines whether or not the space exists between the operated element and the drive member based on a degree of delay of rotation of the drive unit.

5. The reaction force output device according to claim 1, wherein the control unit determines whether or not the space exists between the operated element and the drive member based on a change in consumption current which the drive unit consumes.

6. The reaction force output device according to claim 1, wherein the control unit determines whether or not the space exists between the operated element and the drive member based on an input amount of operation of the operated element and displacement of the drive member which is caused by the drive unit.

* * * * *